(12) United States Patent
Oh et al.

(10) Patent No.: US 6,531,564 B2
(45) Date of Patent: Mar. 11, 2003

(54) WATER-SOLUBLE POLYMERIC ADHESION PROMOTER AND PRODUCTION METHOD

(75) Inventors: Se Yong Oh, Seoul (KR); Chan Eon Park, Pohang (KR); Sang Min Song, Yongin (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 10/183,463

(22) Filed: Jun. 28, 2002

(65) Prior Publication Data

US 2002/0161151 A1 Oct. 31, 2002

Related U.S. Application Data

(62) Division of application No. 09/761,194, filed on Jan. 18, 2001, now Pat. No. 6,455,654.

(30) Foreign Application Priority Data

Sep. 1, 2000 (KR) .......................................... 2000-51487

(51) Int. Cl.⁷ .............................................. C08F 220/10
(52) U.S. Cl. .................... 526/328.5; 526/261; 526/305; 526/307; 526/307.6; 526/307.7; 526/318.42; 526/320; 427/267.1; 427/208; 427/435
(58) Field of Search ................................ 526/261, 305, 526/307, 307.6, 307.7, 318.42, 320, 328.5; 427/207.1, 208, 435

(56) References Cited

FOREIGN PATENT DOCUMENTS

JP 4-80277 3/1992

Primary Examiner—Helen L. Pezzuto
(74) Attorney, Agent, or Firm—Lee & Sterba, P.C.

(57) ABSTRACT

A water-soluble polymeric adhesion promoter is represented by the following formula (I):

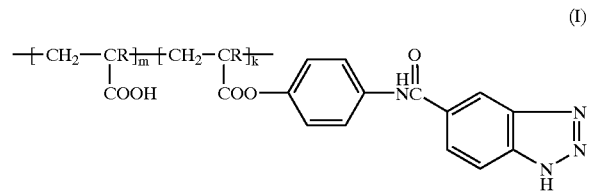

(I)

wherein

R is a hydrogen atom, a hydroxyl group or a lower alkyl group having 1 to 4 carbon atoms, and m and k are numbers selected such that m/k is in the range from about 1/0.001 to about 1/0.1, and such that that the polymer (I) has a weight average molecular weight of about 3,000 to about 600,000.

11 Claims, No Drawings

WATER-SOLUBLE POLYMERIC ADHESION PROMOTER AND PRODUCTION METHOD

This application is a division of application Ser. No.09/761,194 filed Jan. 18 2001, now U.S. Pat. No. 6,455,654.

BACKGROUND OF THE INVENTION

1. Field of the Invention

The present invention relates to a water-soluble polymeric adhesion promoter and methods for its production. In particular, the present invention relates to a water-soluble polymeric adhesion promoter useful for oxidizable metals such as copper, and to methods for its production.

2. Description of the known art

Numerous polymers have been used to provide coatings and adhesiveness to metals, including alkyd, acrylic, epoxy, polyester and polyurethane resins. These polymers are required to bond well to the metals and to provide good coverage, in order to provide corrosion resistance and adhesiveness to the metals.

For this purpose, JP 4-80277A proposes adhesive resins containing a benzotriazole ring in the molecule. The resins may be polyesters, polyurethanes or polyacrylic polymers. However, the benzotriazole ring-containing resin of JP 4-80277A is resistant against solvents and water, and furthermore, is required to be water-insoluble for use in metal coating technologies. The benzotriazole ring is linked directly to the polymer chain.

On the other hand, the use of copper has expanded in the semiconductor fabrication industry due to its excellent electrical and thermal properties. Copper is highly oxidizable and its oxides have a fragile structure, and thus problems remain to be solved in terms of the processability and reliability of the semiconductor fabrication process. The conventional adhesion promoters or corrosion inhibitors employed for metals or ceramics are not suitable for copper or copper products, for example lead frames made from copper ("copper lead frames"), because copper is highly oxidizable and the copper oxides have a weak structure.

Azole compounds or polybenzimidazole (PBI) have been used to inhibit corrosion of, and provide adhesiveness to, copper metals, in particular copper lead frames. Azole compounds including benzotriazole (BAT) are advantageously used because they are water-soluble. However, they have the disadvantages of poor coverage and poor adhesiveness.

Even though polybenzimidazole (PBI) is advantageous over azole compounds in terms of coverage and adhesiveness, it still has the problem that it is not soluble in water and thus requires expensive solvents such as dimethylacetamide (DMA). Moreover, DMA causes environmental pollution.

Thus, there has been a need to provide an aqueous adhesion promoter which can provide, when it is applied to an oxidizable metal, good coverage on the metal surface and excellent adhesiveness for bonding to other materials.

SUMMARY OF THE INVENTION

The present invention provides a new aqueous polymeric adhesion promoter which does not have the problems associated with conventional adhesion promoters or corrosion inhibitors such as benzotriazole ring-containing polymers, azole compounds or polybenzimidazoles. The present invention provides a new polymer useful in inhibiting the corrosion of oxidizable metals and in providing good adhesiveness to the metals for bonding to other materials.

In accordance with one aspect of the present invention, there is provided a polymer represented by the following formula (I):

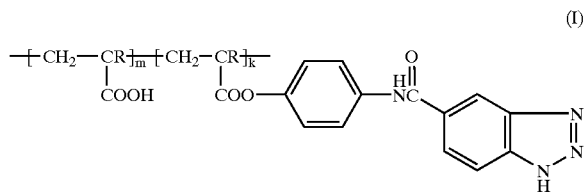

wherein

R is a hydrogen atom, a hydroxyl group or a lower alkyl group having 1 to 4 carbon atoms, and m and k are numbers selected such that m/k is in the range from about 1/0.001 to about 1/0.1, and such that that the polymer (I) has a weight average molecular weight of about 3,000 to about 600,000.

In particular embodiments, m and k are numbers selected such that the polymer (I) has a molecular weight of about 30,000 to about 100,000.

The present invention also provides a method for the production of the polymer of the formula (I) that includes the step of reacting N-(4-phenolyl)-(benzotriazole)amide of the formula

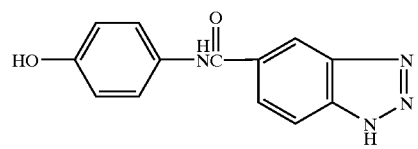

with a polyacryloyl chloride comprising units of the formula

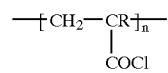

wherein n=m+k.

The present invention also provides an adhesion promoter composition for treating oxidizable metals, which comprises the polymer of the formula (I) and an aqueous carrier.

The present invention further provides a method for treating the surface of an oxidizable metal which comprises the step of applying the polymer of the formula (I) to the surface of the oxidizable metal to provide anti-corrosion and adhesiveness. In particular embodiments, the polymer is applied in the form of an aqueous solution.

The above and other features of the present invention will be apparent to those skilled in the art from the detailed description given below.

DETAILED DESCRIPTION OF THE INVENTION

Priority Korean Patent Application No. 2000-51487, filed Sep. 1, 2000, is incorporated herein in its entirety by reference.

The aqueous polymeric adhesion promoter according to the present invention is represented by the following formula (I)

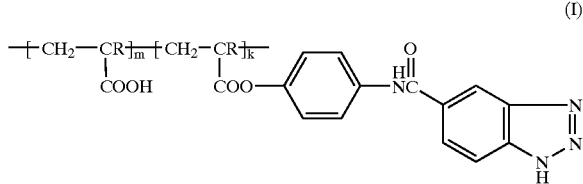

wherein
R is a hydrogen atom, a hydroxyl group or a lower alkyl group having 1 to 4 carbon atoms, and
m and k are numbers selected such that m/k is in the range from about 1/0.001 to about 1/0.1, and such that that the polymer (I) has a weight average molecular weight of about 3,000 to about 600,000.

The polymer (I) provides good coverage, good corrosion inhibition and excellent adhesiveness when applied to the surface of oxidizable metals.

The polymer (I) can be prepared by following the process indicated in the reaction scheme (1) given below.

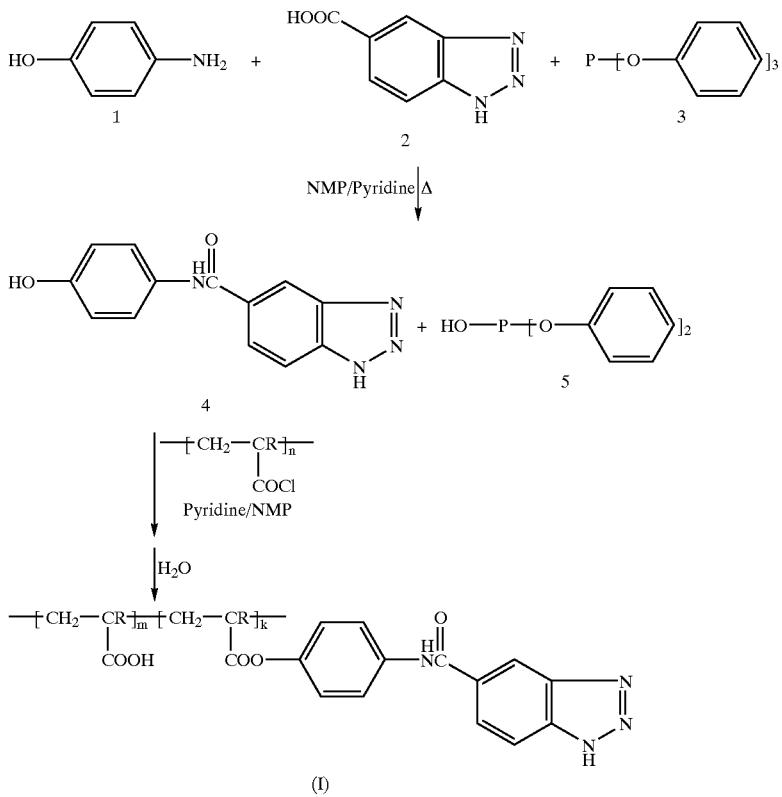

wherein
n=m+k, and
R, m, k and mr/k have the same meanings as defined above in relation with formula (I).

The polymer (I) can be prepared as follows. Thus, 4-aminophenol (①), benzotriazole-5-carboxylic acid ("CBTA" ②) and triphenyl phosphate ("TPP" ③) are reacted together to give N-(4-phenolyl)-(benzotriazole-5-carboxyl)amide ("PBCA" ④) and diphenyl phosphate (⑤). The reaction may be carried out by heating the reaction mixture to about 60–160° C. in the presence of base in an organic solvent.

The base can include, but is not limited to, pyridine, ammonia, $R'_3N$ (wherein R' includes lower alkyl groups having 1–3 carbon atoms) and the like.

The organic solvents can include, but are not limited to, N-methyl pyrrolidone (NMP), dimethyl formamide and the like. TPP (③) is used in the same or almost equivalent amount as aminophenol (①), and the organic solvent is used in an excessive amount, for example about 3 times the amount of aminophenol (①).

Then, a polyacryloyl chloride including units having the formula $-[CH_2-C(R)COCl-]_n-$ is reacted with PBCA (④) to obtain the desired polymer, poly(acrylic-co-4-(5-benzotriazole)amidophenyl acrylate) (PAB, (1)). This reaction can be carried out by heating the reaction mixture to about 20 to about 160° C. in the presence of base in an organic solvent.

The base can include, but is not limited to, pyridine, ammonia, $R'_3N$ (wherein R' includes lower alkyl groups having 1–3 carbon atoms) and the like.

The organic solvents can include, but are not limited to, N-methyl pyrrolidone, dimethyl formamide and the like.

The equivalent ratio of acryloyl chloride in polyacryloyl chloride to PBCA is determined depending on the desired value of m/k. Thus, the equivalent ratio is the same as the value of m/k.

For the present invention, the weight average molecular weight of the polymer (I) preferably is about 3,000 to about 600,000 and more preferably about 30,000 to about 100,000, and is determined by the values of m and k. The ratio of m/k preferably is about 1/0.001 to about 1/0.1. If the m/k ratio is higher than about 1/0.001, the relative content of azole moiety in the polymer (I) is low and the resulting polymer (I) cannot provide satisfactory adhesiveness. If the m/k ratio is lower than about 1/0.1, the polymer (I) is hardly soluble in an aqueous medium, resulting in a limitation of use.

The ratio between the acid group and the benzotriazole group in the polymer is important to give proper water-solubility to the polymer (I) and to provide good adhesiveness to the oxidizable metals. The ratio preferably is between about 1/0.1 and about 1/0.001. In particular, when a metal such as copper is treated with a polymer according to the invention wherein the ratio of m/k is about 1/0.003, the metal shows an increase in adhesiveness of about 4 times.

When a composition containing the polymer (I) is applied to the surface of oxidizable metals, it gives a good coverage of the metals and the metals show good adhesiveness. The metals can be treated by applying the composition by way of dipping the metals in an aqueous solution of the composition or spraying the solution on to the metals. That is to say, the polymer (I) is dissolved in water or a water-alcohol mixture in an amount of about 0.05 to about 1 wt % to give an aqueous solution of the polymer (I). Then, the metals to be treated are dipped into the aqueous solution at a temperature of about 20 to about 80° C., rinsed with water or a water-alcohol mixture and then dried at about 20 to about 150° C. Alternatively, the aqueous solution of the polymer (I) is sprayed onto the metals for about 1 to about 10 seconds and then rinsed and dried similarly.

No additive is required to prepare the aqueous solution of the polymer (I). However, surfactants may be used to increase the solubility of the polymer (I).

The metals to be treated by using the polymer (I) of the present invention include, but are not limited to, oxidizable metals, in particular copper metals. Particularly, lead frames for semiconductor fabrication process can advantageously be treated with the polymer (I). If the lead frames made from oxidizable metals are treated with the polymer (I) they can keep good adhesiveness and are resistant to corrosion during several reliability tests under severe and strict conditions of the semiconductor fabrication process. The lead frames can be made from, but are not limited to, copper metals such as Cu—Fe alloy, Cu—Cr alloy, Cu—Ni—Si alloy or Cu—Sn alloy.

The present invention will be illustrated by way of working examples, which should not be construed as limiting in any way the scope and sprit of the invention.

EXAMPLES

Example 1

4-Aminophenol (4.07 g, 0.037 mol) and NMP (20 g) were placed in a reaction vessel and stirred in 120° C. oil bath. TPP (11.62 g, 0.037 mol) in NMP (10 g), CBTA (6.08 g, 0.037 mol) in NMP (33 g), and pyridine (13.42 g, 0.17 mol) in NMP (7 g) were placed in dropping funnels, respectively. Pyridine and TPP were added into the vessel and then CBTA was added dropwise over a period of 30 min with stirring to give PBCA (5.25 g).

A dry 250 ml 4-neck round bottom flask was fitted with three dropping funnels and a nitrogen inlet with a magnetic stirrer. Polyacryloyl chloride (MW 47,000, 9.60 g (solids 2.40 g)) was placed in the reaction vessel and then PBCA (0.15 g) was added with stirring. Pyridine (0.21 g) was added dropwise for 30 minutes. The reaction proceeded for 2 hr at room temperature. Distilled water (1 ml) was added to the reaction mixture to hydrolyze the remaining acryloyl chloride. After 2 hr, the reaction mixture was added dropwise to distilled water (440 ml) with stirring and PAB was extracted from the reaction mixture using ethyl acetate. The amount of ethyl acetate used was 15 times the amount of NMP used for PAB synthesis. Ethyl acetate was evaporated in a rotary evaporator and the resulting PAB was dried in a vacuum oven at 50° C. to give the desired poly(acrylic-co-4(5-benzotriazole)amidophenyl acrylate) (MW 50,000; m/k=1/0.02, 1.0 g (yield 40%)).

Example 2

A dry 250 ml 4-neck round bottom flask was fitted with three dropping funnels and a nitrogen inlet with a magnetic stirrer. Polyacryloyl chloride (MW 10,000, 9.60 g (solids 2.40 g)) was placed in the reaction vessel and then PBCA (0.375 g) was added with stirring. Pyridine (0.525 g) was added dropwise for 30 minutes. The reaction proceeded for 2 hrs at room temperature. Distilled water (1 ml) was added to the reaction mixture to hydrolyze the remaining acryloyl chloride. After 2 hr, the reaction mixture was added dropwise to distilled water (440 ml) with stirring and PAB was extracted from the reaction mixture using ethyl acetate. The amount of ethyl acetate used was 15 times the amount of NMP used for PAB synthesis. Ethyl acetate was evaporated in a rotary evaporator and the resulting PAD was dried in a vacuum oven at 50° C. to give the desired poly(acrylic-co-4-(5-benzotriazole)amidophenyl acrylate) (MW 55,000; m/k=1/0.05, 1.3 g (yield 52%)).

Example 3

A dry 250 ml 4-neck round bottom flask was fitted with three dropping funnels and a nitrogen inlet with a magnetic stirrer. Polymethacryloyl chloride (MW 47,000, 9.60 g (solids 2.40 g)) was placed in the reaction vessel and then PBCA (0.14 g) was added with stirring. Pyridine (0.20 g) was added dropwise for 30 minutes. The reaction proceeded for 2 hr at room temperature. Distilled water (1 ml) was added to the reaction mixture to hydrolyze the remaining methacryloyl chloride. After 2 hr, the reaction mixture was added dropwise to distilled water (440 ml) with stirring and PAB was extracted from the reaction mixture using ethyl acetate. The amount of ethyl acetate used was 15 times the amount of NMP used for PAB synthesis. Ethyl acetate was evaporated in a rotary evaporator and the resulting PAB was dried in a vacuum oven at 50° C. to give the desired poly(methacrylic-co-4-(5-benzotriazole)amidophenyl acrylate) (MW 55,000; m/k=1/0.02, 1.1 g (yield 44%)).

Comparative Example 1

A dry 250 ml 4-neck round bottom flask was fitted with three dropping funnels and a nitrogen inlet with a magnetic stirrer. Polyacryloyl chloride (MW 10,000, 9.60 g (solids 2.40 g)) was placed in the reaction vessel and then PBCA (2.20 g) was added with stirring. Pyridine (3.16 g) was added dropwise for 30 minutes. The reaction proceeded for 2 hr at room temperature. Distilled water (1 ml) was added to the reaction mixture to hydrolyze the remaining acryloyl chloride. After 2 hrs, the reaction mixture was added dropwise to distilled water (440 ml) with stirring and then stored in a refrigerator for 12 hrs. Then, the reaction mixture was filtered and dried in a vacuum oven at 50° C. to give the desired poly(acrylic-co-4-(5-benzotriazole)amidophenyl acrylate (MW 70,000; m/k=1/0.3, 1.5 g (yield 60%)).

The polymer so obtained is not soluble in water, but soluble in organic solvents such as dimethyl acetamide or n-methylpyrrolidinone.

Experimental Example 1

Copper coupons (C19400, Poongsan Co., Korea) were degreased with dichloromethane and rinsed with acetone.

The copper coupons were then immersed in 5 wt % sulfuric acid solution for 5 min to remove the weak, naturally formed copper oxide and rinsed with distilled water. Next, the copper coupons were immersed in 0.1 wt % aqueous PAB solution (m/k=1/0.05; MW 55,000). The immersion time of the copper coupons in the PAB solution was 15 sec at the reaction temperature of 80° C. The treated copper coupons were then taken out, mildly blown with air and dried at 150° C. for 30 min.

Thus treated copper coupons were subjected to a 90° peel test using 5 mm width copper strip.

O-cresol Novolac epoxy resin (100 parts) and Nadic methyl anhydride (80 parts) as a curing agent were mixed in a 100° C. oil bath, and benzyldimethylamine (0.3 part) as a catalyst was added to the epoxy resin mixture. The epoxy resin mixture was poured onto copper coupons treated with the inventive adhesion promoter, and then cured at 90° C. for 2 hours and at 150° C. for 4 hours to make the copper/epoxy resin joints.

After curing the copper/epoxy resin joints, the copper coupons were cut with the dimensions of 5 mm×70 mm for a 90° peel test. The adhesion strength of the copper/epoxy resin joints was measured by a 90° peel test at a peel rate of 5 mm/min using an Instron (Model 4206).

The number of tested specimens was more than 12 for each experimental condition. The average peel strength was 380 N/m.

Comparative Experimental Example 1

The same experiments were carried out by following the procedure in Experimental Example 1 except that the step of dipping into the 0.1 wt % aqueous PAB solution was omitted. The average peel strength was 50 N/m.

Comparative Experimental Example 2

The same experiments were carried out by following the procedure in Experimental Example 1 except that a 0.003 M benzotriazole solution was employed instead of the 0.1 wt % aqueous PAB solution. The average peel strength was 160 N/m.

Experimental Example 2

The same experiments were carried out by following the procedure in Experimental Example 1 except that PAB having an m/k value of 1/0.003 and a MW of 50,000 was employed. The average peel strength was 250 N/m.

Experimental Example 3

The same experiments were carried out by following the procedure in Experimental Example 1 except that the immersion time of the copper coupons in the PAB solution was 10 min. The average peel strength was 125 N/m.

Whereas particular embodiments of the invention have been described above for purposes of illustration, it will be appreciated by those skilled in the art that numerous variations of the details may be made without departing from the invention as described in the appended claims.

What is claimed is:

1. A process for treating an oxidizable metal to improve the corrosion resistance thereof and to provide adhesiveness to the oxidizable metal, the process comprising the step of applying to a surface of said oxidizable metal a water-soluble polymer represented by the following formula (I)

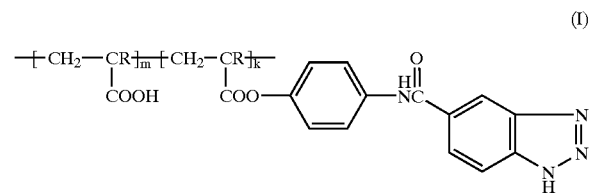

wherein
R is a hydrogen atom, a hydroxyl group or a lower alkyl group having 1 to 4 carbon atoms, and
m and k are numbers selected such that m/k is in the range from about 1/0.001 to about 1/0.1, and such that that the polymer (I) has a weight average molecular weight of about 3,000 to about 600,000.

2. A process according to claim 1, wherein said water-soluble polymer is a poly(acrylic-co-4-(5-benzotriazole) amidophenyl acrylate).

3. A process according to claim 1, wherein said polymer is applied in the form of an aqueous solution.

4. A process according to claim 1, wherein said aqueous solution is prepared by dissolving said polymer in water or a water-alcohol mixture.

5. A process according to claim 1, wherein said oxidizable metal is a copper metal.

6. A process according to claim 3, wherein said oxidizable metal is a copper metal.

7. A process according to claim 4, wherein said oxidizable metal is a copper metal.

8. A process according to claim 1, wherein said oxidizable metal is selected from the group consisting of Cu—Fe alloy, Cu—Cr alloy, Cu—Ni—Si alloy and Cu—Sn alloy.

9. A process according to claim 3, wherein said oxidizable metal is selected from the group consisting of Cu—Fe alloy, Cu—Cr alloy, Cu—Ni—Si alloy and Cu—Sn alloy.

10. A process according to claim 4, wherein said oxidizable metal is selected from the group consisting of Cu—Fe alloy, Cu—Cr alloy, Cu—Ni—Si alloy and Cu—Sn alloy.

11. A process according to claim 1, wherein said oxidizable metal is in the form of a lead frame.

* * * * *